E. F. GIRARDEAU.
DYNAMO FOR LIGHTING AND MOTOR IGNITION.
APPLICATION FILED OCT. 15, 1915.

1,346,821.

Patented July 20, 1920.

E. F. GIRARDEAU.
DYNAMO FOR LIGHTING AND MOTOR IGNITION.
APPLICATION FILED OCT. 15, 1915.

1,346,821.

Patented July 20, 1920.
3 SHEETS—SHEET 3.

Witnesses

Inventor
Emile Fernand Girardeau,
By
Attorney

UNITED STATES PATENT OFFICE.

EMILE FERNAND GIRARDEAU, OF PARIS, FRANCE.

DYNAMO FOR LIGHTING AND MOTOR IGNITION.

1,346,821.     Specification of Letters Patent.     Patented July 20, 1920.

Application filed October 15, 1915. Serial No. 56,103.

*To all whom it may concern:*

Be it known that I, EMILE FERNAND GIRARDEAU, engineer, residing in Paris, France, 10 Rue Auber, have invented new and useful Dynamos for Lighting and Motor Ignition.

Electric machines are already known combining in the same frame an explosion-motor, ignition-magneto and a dynamo. Machines of this kind are chiefly employed in motor cars, where they effect the ignition of the motor, the illumination of the search-lights and carriage lamps, and the feeding of all accessories, such as motor car signaling devices, starters, etc.

They consist of a case of permanent magnets, with the optional addition of field-magnet windings in which two armatures rotate, one giving the ignition current, and the other the illuminating current.

The object of the present invention is an electric machine having a single rotating armature, capable of effecting the ignition of an explosive motor, and of supplying an electric current suitable for illumination and all other required purposes, the current being either continuous or alternating with variable or constant voltage.

Figure 1:
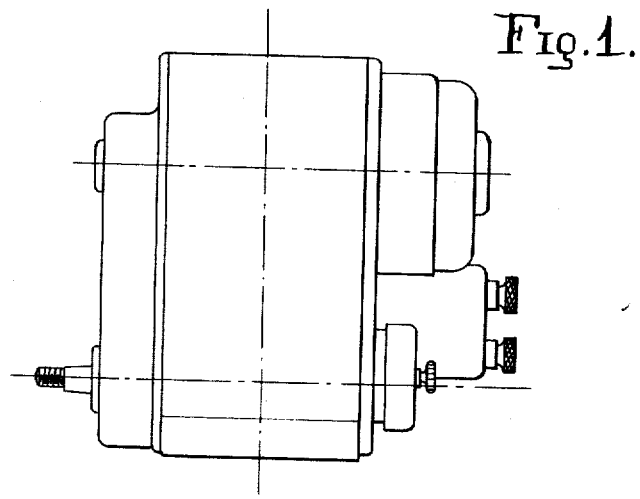
Figure 1 shows by way of example, a front view of the machine.

The machine consists of a dynamo of which the armature 1 rotates in a field produced either by magnets or by coils, or by a combination of magnets and a coil, or coils.

This armature is driven, by means of chain-gear 17, from a shaft 21, situated in the same frame, driven directly by the motor, and actuating a make-and-break switch 5.

The current from the dynamo excites the primary winding of an induction coil 4, also located in the same casing, of which induction coil the secondary is connected to the sparking plug or plugs by means of a distributer 16.

A high-tension induction current is therefore obtained from the secondary winding of the coil 4, which can be used for the ignition; and the armature supplies continuous or alternating current, which can be utilized for all suitable purposes.

Naturally, the form of the machine may be different from that indicated by way of example in the drawings, without departing from the nature of the invention, and in particular the relative conditions of the different parts may be varied.

Thus, the two shafts may be placed in the same horizontal plane, or in alinement with one another; similarly, the dynamo shaft may be driven direct by the motor, and the connection between the armature and the shaft 21 effect by gear wheels, friction gearing or any other suitable means. The arrangement of the distributer could be different, and so could that of the interrupter which might for example be placed on the same side as the pinion of shaft 21.

The induction coil 4 may be concentric with the shaft 21. Naturally, in the case of a concentric coil, this shaft would be of non-magnetic metal.

The particular arrangement indicated by the drawings presents several characteristic advantages, for which we claim priority. First of all, the direct drive of the shaft 21 by the motor insures the reliable working of the make-and-break device and consequently the ignition of the motor with the help of the accumulators, even in the event of the chain 17 breaking or the armature 1 being damaged.

The height of the axis of the shaft 21 above the foundation is more or less equal to that of the ignition magnetos in general use. Any magneto can therefore be replaced by the machine with the utmost facility in fitting.

The accessories necessary for ignition, distributer, and make-and-break device being controlled by the shaft 21, the speed of rotation of the armature can be of any desired degree.

Figures 2, 3:
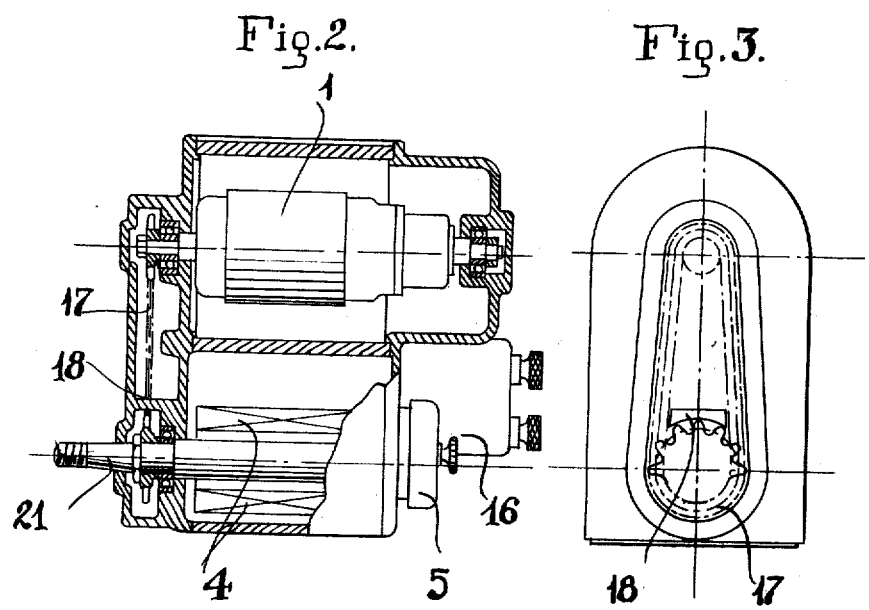
Fig. 2 is a section of Fig. 1.
Fig. 3 is a side view, in which the cover has been removed.
Figure 4:
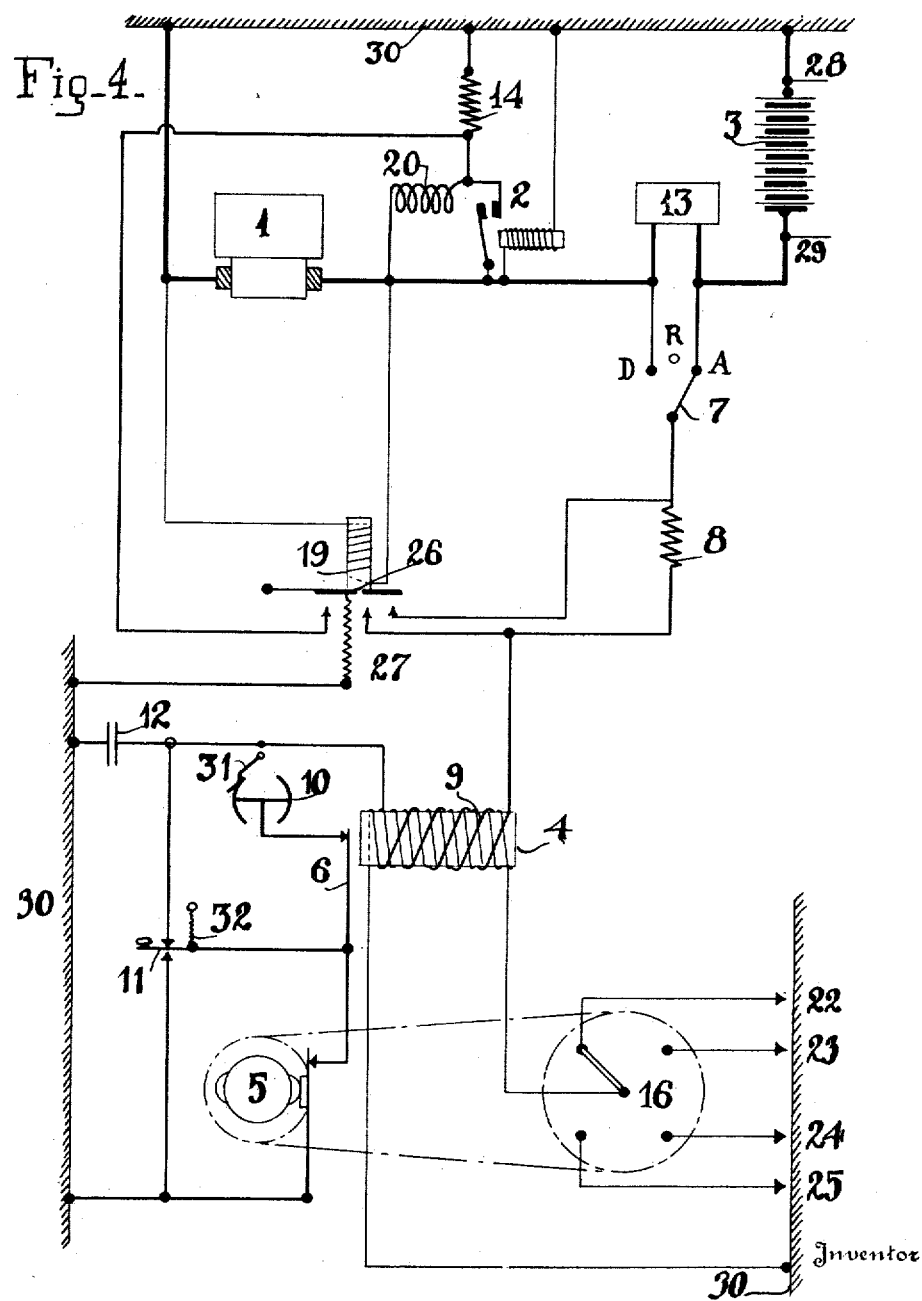
Fig. 4 is a diagram showing the mounting of the apparatus.

Fig. 3 shows the particular arrangement of this chain 17, serving to drive the armature. The chain is situated in a sort of gear-case, the sides of which are very close to the periphery of the gear wheels, and in which is a web or partition 18, which covers the lower gear-wheel, only allowing such space as is necessary to enable the chain to pass. In this way, in the event of accidental breakage of the chain 17, the latter can not get wedged in between the teeth of the gear-wheels and the sides of the gear-case, there being insufficient space, the chain on the contrary comes to rest on the web or partition 18, without causing any accident. It will consequently be possible, in the event of this chain breaking, to continue to excite the ignition coil 4 by means of a battery of accumulators. Fig. 4 represents the arrangement of the apparatus used in a motor car to secure the illumination and the ignition of the motor. The dynamo is maintained at constant tension by a vibratory tension regulator comprising a resistance in series with the field-magnet of the dynamo.

The armature of the dynamo is shown at 1 and its field by the coil 20. The vibrating regulator is represented by 2, and the resistance in series with the excitation by 14, the commutator switch by 13 and the battery of accumulator by 3.

Current at constant tension can thus be obtained in spite of variations in the load and velocity.

The ignition of the sparking-plugs 22, 23, 24 and 25 (taking by way of example the case of a four-cylinder motor) is secured by the breaking of the current in a primary winding of the induction coil 4, to which primary the current is supplied either by the dynamo, or by the accumulators, the secondary winding being led to the various sparking plugs through a distributer 16, coöperating with the make-and-break device 5, to which it is connected in the usual manner by toothed gearing or any other suitable means.

The object of the invention is to enable the lighting of the carriage, the starting of the motor either by the aid of the accumulators or of the dynamo or of the crank or by simply pressing a push, to be effected when desired.

The current necessary for illumination or for feeding the accessories is supplied by the terminals 28 and 29.

We are going to examine separately the functions of the various organs in each of the operations that can be effected with our apparatus.

When starting by means of the crank, or by means of accumulators which is the ordinary case, the switch 7 may occupy three positions; D (dynamo) A (accumulators) R (rest). The switch 7 being on the contact stud A, the battery of accumulators is connected to one part of the mass 30; the dynamo being stopped, and the commutator 13 open. The current passes across the switch 7, and reaches the primary winding 9 of the coil 4, without passing through the resistance 8, which is short circuited through the relay 19. The relay coil 19 is connected direct to the terminals of the dynamo, and when the potential of the latter is not at its normal value, the armature of the relay is operated by the spring 27, which also serves as a conductor and is connected to the mass. This armature is composed of two conducting parts separated by an insulating part 26. When the armature is operated by the spring one of the conducting parts short-circuits the resistance 14, and the other the resistance 8. On leaving the primary winding 9 the current can not go to the mass, as it is stopped by the condenser 12, so it passes through the push 11, which, being held in position by a spring 32, short circuits the members 6 and 10, hereinafter explained and finally passes through the make and break device 5 to the mass 30. The condenser 12 is branched to the terminals of the interrupter gap in order to absorb the induction current at breaking.

Under these conditions it will be noted that it is sufficient to turn the crank of the motor to obtain a start. The distributer and the interrupter are controlled by the motor with a suitable key and relation of speed.

The motor having been started, as soon as the speed is sufficient and the voltage of the dynamo reaches its normal value, the switch 19 and the switch 13 come to an action, the resistance 14 and 8 are put into circuit, and the dynamo is branched in parallel with the accumulators, which now only serve as a buffer or equalizing device.

The resistance 14, placed in series with the field magnet 20, is necessary for the working of the constant tension regulating apparatus.

The object of the resistance 8 is to diminish the time-constant of the coil 9, in order to increase the rapidity with which the flow of current in the primary winding is established, which is especially important with high speed motors, in which the frequency of breaking is very great. The cutting out of this resistance at the moment of starting has the effect of increasing the intensity given out by the accumulators in the primary circuit of the coil 4, which enables a more intense flow to be obtained at that moment, and consequently a fatter spark.

When starting by means of the crank, or by means of the dynamo, in the case where the accumulators are discharged and no longer enable the starting of the motor to be secured, the switch 7 is placed on the contact stud D. The circuit is the same as in the previous case, with this difference only, that the current is applied by the dynamo instead of by the accumulators. In this case, the short-circuiting of the two resistances acquires its greatest result, because on the one hand the excitation current is reinforced by the resistance 14 being excluded from the circuit, and on the other hand, the voltage required at the dynamo in order to produce in the winding 9 the same current as during normal working, (when 8 is in series) is rendered much weaker. The starting can thus be effected though the speed at which the dynamo is rotated, by the crank, is considerably less than its normal speed of rotation.

When starting by means of a push-button, obviously, this method of starting is only possible on the accumulators. The principal switch is therefore in position A, and the circuit is exactly the same as in the first case.

Instead of turning the crank, one merely presses the push 11, thus short circuiting the break 5, and inserting the members 6 and 10 in the circuit.

6 is a trembler that produces rapid interruptions of the primary current; its magnetic core can, for example, be common with that of the coil 4.

10 represents a rotary switch controlled by the make-and-break device, the sectors of which are proportioned in such a way that the primary current can only be closed if the piston of the cylinder in which the spark is to be produced has passed the position corresponding to maximum compression; in this way backward rotation is avoided which occurs when starting with advanced ignition.

If the contact member 31 is not resting on either of the two sectors, the circuit being broken, the trembler will not work; it suffices then to turn the crank very slightly in order to bring the contact member 31 on the one of the sectors. It may further be remarked that this occurrence is exceedingly rare. In the normal stopping position of a four-cylinder motor, for example, the pistons stop at half-stroke, and the dimension of the sectors of the rotary switch 10 is selected in such a way that the contact member 31 rests on one of them for this position of the pistons.

In this last arrangement, the condenser 12 is also placed across the terminals of the switch 6, to absorb the current due to the breaking of the circuit in the secondary winding.

The push 11 may be situated on the front of the carriage near the starting crank, or other suitable position.

Two pushes may be used arranged in parallel, one in each two suitable positions, as it may be remarked, that such a push-button may be useful in the case of crank-starting; in fact, it is easy to turn the crank with one hand, and to press the push-button 11 with the other, and the engine can thus be started more easily because on the one hand; the working of the trembler 6 produces more rapid interruptions than those of the make-and-break device 5 when the crank is worked; on the other hand, there will be no risk of the crank reversing, which may occur when the push 11 is not used and if the device 5 is not previously brought back to its position of rest at the ignition.

The control of the push may also be automatic and may for example, be effected by the relay 19, in fact, it is easy to make, it short-circuit the device 5 at the same time that it short-circuits the resistances 8 and 14. In this way the trembler 6 and the switch 10 will always be available for the starting of the motor without it being necessary to touch the push while the crank is being turned. In this latter case the action of the switch 7 alone effects the starting of the motor. As soon as the voltage of the dynamo is sufficient, the device 5 is automatically put back into circuit.

When starting by means of the auxiliary magneto, it is difficult, if not impossible, to start very powerful motors having dynamo-ignition from the crank, on account of the great force required to rotate the dynamo at a sufficient speed. This difficulty may be overcome by the use of a small auxiliary magneto which will effect the production of sparks in the proper cylinder, as the motor can always be turned slowly in order to bring about the suction of the gases by the cylinders.

Figure 5:
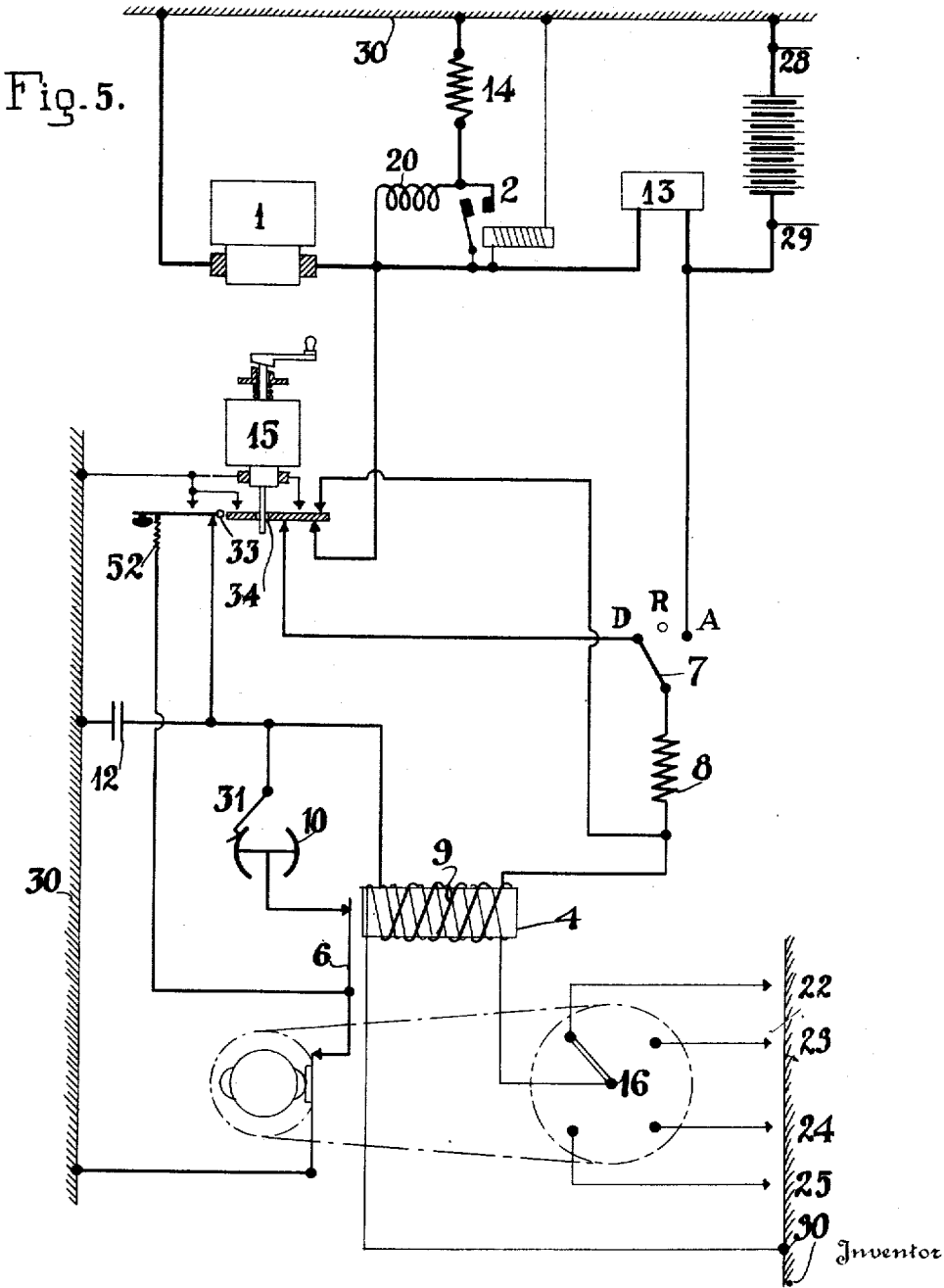
Fig. 5 is a modification of the arrangement, shown in Fig. 4 for use with very powerful motors.

In order to apply such an auxiliary magneto to the arrangement shown in Fig. 4 the arrangement is modified as shown in Fig. 5 so that the auxiliary magneto 15 automatically brings about the necessary connections at the moment of starting up, which connections were brought about in Fig. 4 by the relay 19 which is thus dispensed with.

To this end, the shaft of the magneto 15 carries for example, a conductor consisting of two parts separated by an insulating part 34. This conductor carries a push, which replaces the button 11 of Fig. 4, and it is jointed at 33, in such a way that the button partakes of the movement of the conductor but can be separately worked up and down by hand.

When the magneto is stopped, this conductor rests on a series of contacts which establish the same connections as those of the arrangement shown in Fig. 4, as if the magneto 13 did not exist. When the crank of the magneto 15 is turned, the conductor presses automatically on the upper contacts, according to a known arrangement applied to the calling magnetos of telephones, and it will be seen that the current from the magneto, of which one brush is connected to the mass, passes through the primary winding 9 without traversing the resistance 8, then reaches the members 10 and 6, and returns to the mass through the spring 32.

As soon as the motor is started, and the handle of the magneto is let go, the conductor returns to its first position, and the ignition is then effected by the dynamo 1.

As in the diagram of Fig. 4, the starting of the motor can be effected by merely pressing the button, the switch 7 being of course, in the position A.

Hence it is only in the event of the accumulators being discharged that the small auxiliary magneto 15 will have to be used.

Figs. 4 and 5, given by way of example, can, of course, be modified without departing from the nature of the invention.

The apparatus may be arranged in any way to produce the desired result and the form and construction of the appliances used, the mounting can be varied according to the uses for which they are intended.

The invention may be applied not only to motor vehicles but also to all uses where it is necessary to obtain, either simultaneously or separately, a continuous or alternating current, at variable constant tension, and a continuous alternating current at high tension.

Having now particularly described and ascertained the nature of my said invention and the manner in which the same is to be performed, what I claim is:

In ignition apparatus for explosion motors, the combination of an induction coil, means to supply said coil with current when the motor is running and including an ohmic resistance arranged in series with the primary of said coil, to diminish the time constant of the coil, and means to automatically short-circuit such ohmic resistance when the motor is stopped, to provide at the moment of starting, an increase of current in the coil.

In testimony whereof I have signed my name to this specification in presence of two witnesses.

EMILE FERNAND GIRARDEAU.

Witnesses:
CHAS. P. PRESSLY,
EUGENE FESTAVIN.